G. M. LOWE.
ADJUSTABLE HOG TRAP.
APPLICATION FILED MAR. 31, 1913.

1,078,509.

Patented Nov. 11, 1913.

2 SHEETS—SHEET 1.

Witnesses

Inventor
G. M. Lowe.

By
Attorneys

UNITED STATES PATENT OFFICE.

GEORGE M. LOWE, OF RIDGEWAY, MISSOURI.

ADJUSTABLE HOG-TRAP.

1,078,509.

Specification of Letters Patent.   Patented Nov. 11, 1913.

Application filed March 31, 1913.   Serial No. 757,961.

*To all whom it may concern:*

Be it known that I, GEORGE M. LOWE, a citizen of the United States, residing at Ridgeway, in the county of Harrison, State of Missouri, have invented certain new and useful Improvements in Adjustable Hog-Traps; and I do hereby declare the following to be a full, clear, and exact description of the invention, such as will enable others skilled in the art to which it appertains to make and use the same.

This invention relates to improvements in hog traps.

One object of the invention is to provide a simple adjustable device of this character which is designed to be used for ringing, drenching, or permitting surgical operations on hogs.

Another object is to so construct the trap for hogs that the hog may be driven into the trap, or the trap placed over it and an attempt to escape by sticking its nose through one end of the trap will cause the closing of the door to securely hold the hog imprisoned.

Other objects and advantages will be apparent from the following description when taken in connection with the accompanying drawings.

Figure 1:
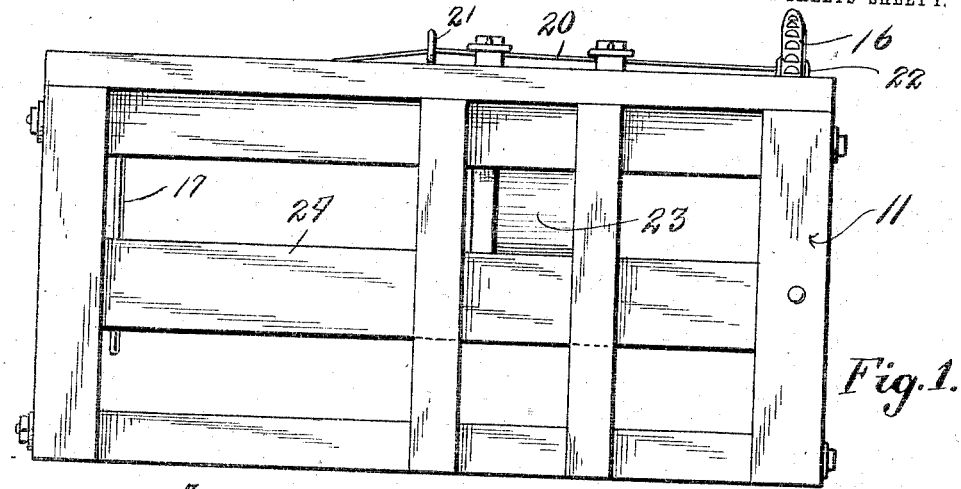
Figure 3:
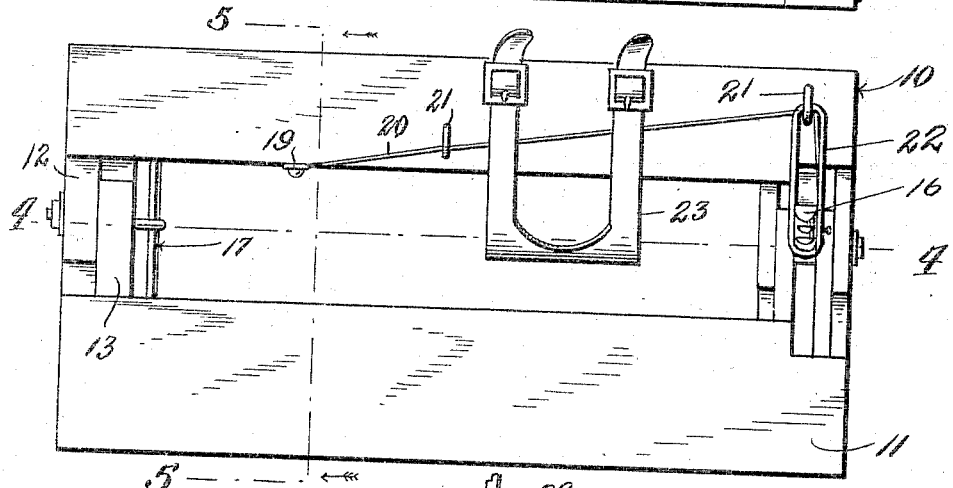
Figure 2:
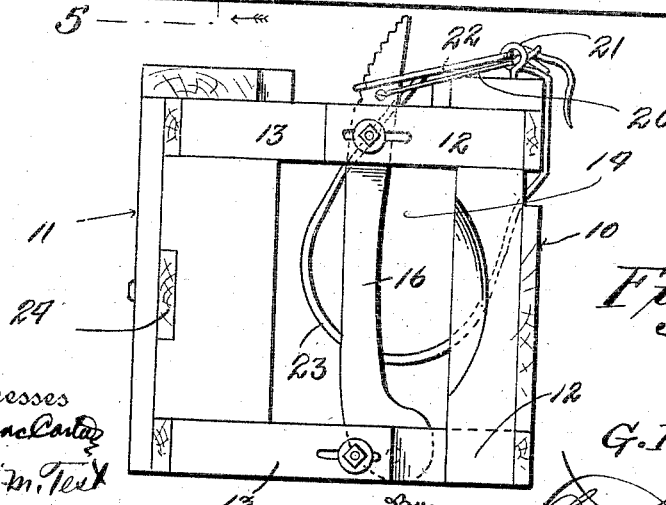
Figure 2:
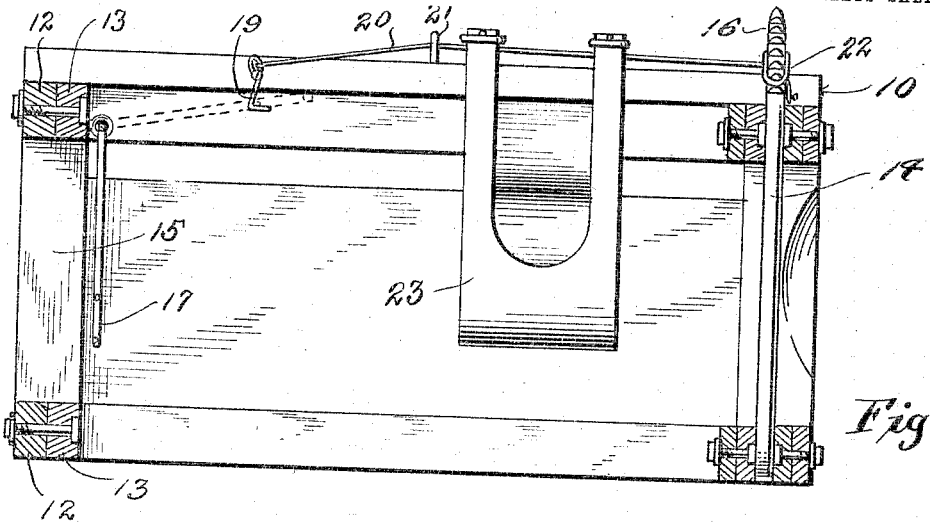
Figure 6:
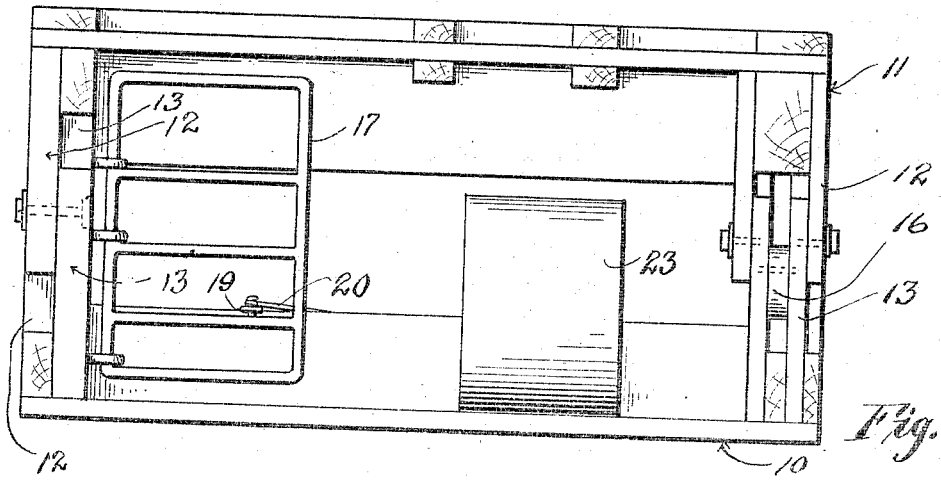
Figure 5:
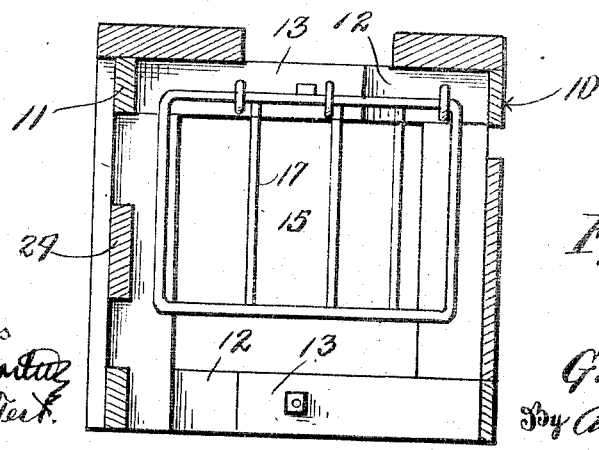

In the drawings: Figure 1 is a side elevation of a trap made in accordance with my invention. Fig. 2 is an end elevation from the nose holding end of the trap. Fig. 3 is a top plan view. Fig. 4 is a vertical longitudinal sectional view on the line 4—4 of Fig. 3. Fig. 5 is a vertical transverse view on the line 5—5 of Fig. 3. Fig. 6 is a bottom plan view of the trap.

Referring particularly to the accompanying drawings, 10 and 11 represent the opposite side sections of my trap, these sections being provided with the inwardly extending slotted strips 12 and the bolt carrying strips 13, whereby the sections may be adjusted toward and away from each other to accommodate animals of different sizes. Both ends of the trap are open, as indicated at 14 and 15, respectively, and in the end 14 is pivoted a vertical stanchion bar 16, this bar being adapted to be drawn toward the section 10 to securely hold the animal's head which protrudes from the trap to permit a ring being placed in its nose. In the opposite end of the trap is a swinging gate 17, this gate being adapted to be engaged with a pivoted hook 19 pivotally carried in the upper portion of the section 10, to hold the gate in elevated position. Connected at one end to this hook 19, and at its other end to the upper end of the stanchion bar 16 is a wire 20, this wire passing through suitable guides 21.

In using the trap for ringing a hog's nose, or for applying a dose of medicine, the door is raised and engaged with the hook 19, and the hog is then driven through the opening 15. When the hog is inside the trap the stanchion bar is swung over to provide a space between the bar and the section 10, through which the hog will naturally stick its head in an effort to escape. When this is done, the stanchion bar is pushed over to securely hold the animal's head in the opening, after which the loop 22 is engaged over the upper end of the bar 16 to hold the same in position. When the lever 16 is moved out of clamping position, the wire rocks the hook on its pivot and permits the gate to fall, thus preventing the animal backing out of the trap. If desired, the gate need not be raised, in which case the trap is lifted and set down over the animal.

Secured to the section 10 is a wide belt 23 which is adapted to be buckled around the animal's body to hold the same securely in position. When the animal is so held, the trap is turned over on one side, and a movable bar 24 in the section 11 is moved to one side, and one of the animal's hind legs drawn up through the opening and tied to the trap. The animal is then securely held from movement, and various surgical operations can be performed.

What is claimed is—

A hog trap comprising a bottomless structure consisting of a pair of sections adjustable toward and away from each other, both ends of the trap being open, a swinging gate at one end of the trap, a pivoted stanchion bar, means for holding the gate in elevated position to permit an animal to enter the trap, and connections between the stanchion bar and the holding means whereby when the stanchion bar is moved out of clamping position the gate will be permitted to fall and prevent the animal backing from the trap.

In testimony whereof, I affix my signature, in the presence of two witnesses.

GEORGE M. LOWE.

Witnesses:
S. D. RAWLIN, Jr.,
C. L. BUSH.